Figures 1, 2:
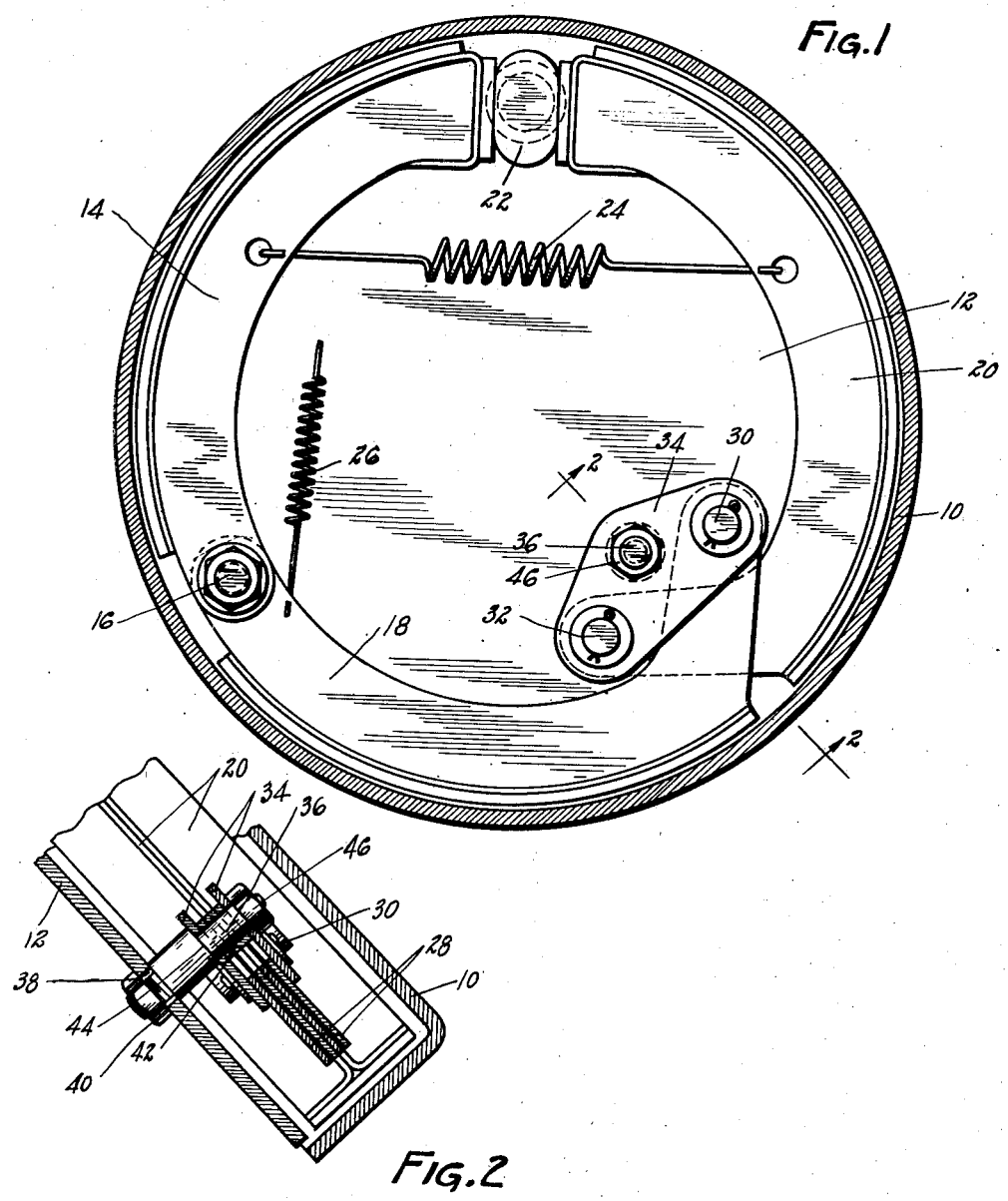

Aug. 30, 1932.

A. Y. DODGE 1,874,928

BRAKE

Filed June 11, 1928

INVENTOR
ADIEL Y. DODGE
BY
*M. W. McConkey*
ATTORNEY

Patented Aug. 30, 1932

1,874,928

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 11, 1928. Serial No. 284,576.

This invention relates to brakes, and is illustrated as embodied in an internal expanding automobile brake. An object of the invention is to equalize the action of the several shoes of the brake, so far as possible, by connecting the shoes by means operated by excessive friction on one shoe to move that shoe slightly in a brake-releasing direction and at the same time to move the other shoe slightly in a brake-applying direction.

In one desirable arrangement, the shoes (which preferably overlap each other) are connected at their ends by novel means such as a triangular lever device fulcrumed at one apex between the ends of the shoes, so that it is rocked by excessive torque on one shoe to move that shoe slightly away from the drum and at the same time to move the other shoe slightly toward the drum to increase its effectiveness. This device, which embodies considerable novelty in the details of its construction, also serves as the anchor of the brake.

The above and other objects and features of the invention, including various novel and desirable details of construction, will be apparent from the following description of the illustrative embodiment shown in the accompanying drawing, in which:

Figure 1 is a vertical section through the brake, just inside the head of the brake drum, and showing the brake shoes in side elevation; and Figure 2 is a partial section through the brake anchorage on the line 2—2 of Figure 1.

The brake selected for illustration includes a rotatable drum 10, at the open side of which is a backing plate 12, and within which is the friction means of the brake. This friction means may include a primary shoe 14, connected by a floating pivot 16 to a secondary shoe 18, together with an auxiliary shoe 20. The brake is applied by means such as a double cam 22 acting against the resistance of a return spring 24, the secondary shoe 18 being operated by the primary shoe 14 against the resistance of an auxiliary return spring 26.

Shoe 18 is forked at its end to form anchoring or pivot arms 28 straddling the end of shoe 20 and mounted on a pivot or anchor 30. Shoe 20 is mounted on a pivot or anchor 32. Pivots 30 and 32 are connected by means such as a pair of stamped plates or triangular levers 34, having at their inner apex a fixed bolt or the like 36 between the pivots 30 and 32, and which serves as a fulcrum for members 34, and which passes adjustably through a slot 38 in the backing plate and is clamped tightly in adjusted position by means such as a nut 40. The bolt 36 takes the braking torque of all three shoes when the brake is applied.

Members 34 are separated by a spacer or washer 42, and are confined between a shoulder 44 on the bolt 36 and a nut 46 threaded on the reduced end of the bolt into a relatively light frictional contact with the outer of the members 34. This insures that members 34 are held against turning only by the relatively light friction of the parts.

In operation, with the brake applied, if shoe 18 exerts a materially greater torque on members 34 than shoe 20, it will rock the right-hand ends of members 34 upwardly, thus forcing the left end downwardly. This moves shoe 18 slightly in a brake-releasing direction and shoe 20 in a brake-applying direction. If the torque from shoe 20 materially exceeds that from shoe 18, the action will be reversed.

While one illustrative embodiment has been described in detail, it is not my intention to limit its scope to that particular embodiment, or otherwise than by the terms of the appended claims.

I claim:

1. A brake comprising, in combination, a pair of overlapping brake shoes, an anchor pivot for the end of each shoe, a pair of plates on opposite sides of the shoes in which said pivots are mounted, and a fixed fastening between said pivots passing therethrough and holding said plates and taking the torque exerted against both pivots.

2. A brake comprising, in combination, a pair of overlapping brake shoes, an anchor pivot for the end of each shoe, a movable device in which said pivots are mounted, and a single fixed fastening between said pivots holding said device and taking the torque exerted against both pivots.

3. A brake comprising, in combination, a pair of overlapping brake shoes, a fixed member between the ends of said shoes, and means connecting the ends of the shoes and fulcrumed on said member and transmitting the torque of both shoes to said member and operated as a lever by excessive friction on one shoe to move said shoe in a brake-releasing direction and the other shoe in a brake-applying direction.

4. A brake comprising, in combination, a pair of brake shoes, an anchorage taking the torque of said shoes and means connecting the shoes and transmitting the torque of both shoes to said anchorage and operated by excessive friction on one shoe to move said shoe in a brake-releasing direction and the other shoe in a brake-applying directon.

5. A brake comprising, in combination, a pair of shoes, and a triangular lever connected to both shoes and fulcrumed between the shoes and which takes the torque of both shoes and which also rocks on its fulcrum in case of excessive friction on one shoe to move said shoe in a brake-releasing direction and to move the other shoe in a brake-applying direction.

6. A brake comprising, in combination, a pair of shoes, and a lever connected to both shoes and which rocks on its fulcrum in case of excessive friction on one shoe to move said shoe in a brake-releasing direction and to move the other shoe in a brake-applying direction and which takes the braking torque of both shoes.

7. A brake comprising, in combination, a pair of overlapping brake shoes, an anchor pivot for the end of each shoe, a movable device in which said pivots are mounted and a single fixed fastening equidistantly spaced from said pivots between the same, said fastening holding said device and taking the torque exerted against both pivots.

8. A brake comprising, in combination, a pair of brake shoes, a fixed member and means connecting the shoes and transmitting the torque of both shoes to said member and operated by excessive friction on one shoe to move one of said shoes in a brake applying direction and the other in a releasing direction.

9. A brake comprising, in combination, a pair of shoes and a triangular lever connected to both shoes and fulcrumed between the shoes and which takes the torque of both shoes and which also rocks on its fulcrum in case of excessive friction on one shoe to move the other shoe in a brake applying direction and said one shoe in a releasing direction.

10. A brake comprising, in combination, a pair of shoes and a lever connected to both shoes and which rocks on its fulcrum in case of excessive friction on one shoe to move the other shoe in a brake applying direction and said one shoe in a releasing direction and which takes the braking torque of both shoes.

In testimony whereof, I have hereunto signed my name.

ADIEL Y. DODGE.